US012199389B2

(12) United States Patent
Iwamoto

(10) Patent No.: US 12,199,389 B2
(45) Date of Patent: Jan. 14, 2025

(54) MULTIPLE COAXIAL CONNECTOR

(71) Applicant: HOSIDEN CORPORATION, Osaka (JP)

(72) Inventor: Yuta Iwamoto, Osaka (JP)

(73) Assignee: HOSIDEN CORPORATION, Osaka (JP)

( * ) Notice: Subject to any disclaimer, the term of this patent is extended or adjusted under 35 U.S.C. 154(b) by 408 days.

(21) Appl. No.: 17/745,222

(22) Filed: May 16, 2022

(65) Prior Publication Data

US 2022/0385006 A1 Dec. 1, 2022

(30) Foreign Application Priority Data

May 25, 2021 (JP) ................................ 2021-087501

(51) Int. Cl.

| | |
|---|---|
| ***H01R 24/38*** | (2011.01) |
| ***H01R 13/642*** | (2006.01) |
| *H01R 103/00* | (2006.01) |

(52) U.S. Cl.

CPC ........... *H01R 24/38* (2013.01); *H01R 13/642* (2013.01); *H01R 2103/00* (2013.01)

(58) Field of Classification Search

CPC ........ H01R 9/05; H01R 9/053; H01R 13/642; H01R 24/38

See application file for complete search history.

(56) References Cited

U.S. PATENT DOCUMENTS

| | | | | |
|---|---|---|---|---|
| 6,257,927 | B1 * | 7/2001 | Suzuki | H01R 24/50 439/607.05 |
| 7,481,673 | B1 * | 1/2009 | Qu | H01R 13/5219 439/578 |
| 10,186,817 | B2 * | 1/2019 | Paynter | H01R 43/20 |
| 2014/0073160 | A1 * | 3/2014 | Shinder-Lerner | H01R 12/91 439/246 |
| 2018/0366843 | A1 * | 12/2018 | Maki | H01R 24/42 |

FOREIGN PATENT DOCUMENTS

| | | |
|---|---|---|
| JP | 2021-012847 A | 2/2021 |
| WO | WO2021/005998 A1 | 1/2021 |

* cited by examiner

*Primary Examiner* — Christopher M Koehler
*Assistant Examiner* — Carlos E Lopez-Pagan
(74) *Attorney, Agent, or Firm* — Greenblum & Bernstein, P.L.C.

(57) ABSTRACT

A plug includes a housing, a plurality of plug shells that are accommodated in the housing in a manner to protrude from the housing by a predetermined length A, a plurality of plug bodies that are accommodated in the plug shells respectively, and a plurality of plug contacts that are fixed to the plug bodies respectively. A receptacle includes a receptacle shell, a receptacle body, and a receptacle contact. The receptacle shell includes: an accommodation portion that entirely accommodates ends of the plurality of plug shells protruding from the housing, and whose insertion-direction length B satisfies B<A.

8 Claims, 5 Drawing Sheets

MULTIPLE COAXIAL CONNECTOR

TECHNICAL FIELD

The present invention relates to a multiple coaxial connector.

BACKGROUND ART

For example, Japanese Patent Application Laid Open No. 2021-012847 (hereinafter, referred to as Patent Literature 1) discloses a connector that can reduce insertion resistance to a mounting hole.

The connector of Patent Literature 1 includes a connector housing that is inserted into a mounting hole of a case in an insertion direction, a first rubber ring that is provided on an outer peripheral surface of the connector housing to waterproof a space between the outer peripheral surface of the connector housing and an inner peripheral surface of the mounting hole, and a second rubber ring that is provided on the outer peripheral surface of the connector housing. The first rubber ring is made of oil-containing rubber that contains oil. The second rubber ring is provided on the front side of the insertion direction with respect to the first rubber ring. The second rubber ring has a smaller crushing allowance than the first rubber ring.

Connectors of related art are inferior in their mechanisms to correct tilt and shaft misalignment occurring in fitting between a plug and a receptacle. Therefore, the tilt and shaft misalignment may increase a force imposed on a contact in insertion and cause buckling of the contact.

SUMMARY OF THE INVENTION

An object of the present invention is to provide a multiple coaxial connector that is provided with a mechanism for correcting tilt and shaft misalignment in fitting between a plug and a receptacle and can accordingly prevent buckling of a contact and reduce an insertion force in the fitting.

A multiple coaxial connector of the present invention includes a plug and a receptacle that is connected with the plug.

The plug includes a housing, a plurality of plug shells that are accommodated in the housing in a manner to protrude from the housing by a predetermined length A, a plurality of plug bodies that are accommodated in the plug shells respectively, and a plurality of plug contacts that are fixed to the plug bodies respectively.

The receptacle includes a receptacle shell, a receptacle body, and a receptacle contact. The receptacle shell includes: an accommodation portion that entirely accommodates ends of the plurality of plug shells protruding from the housing, and whose insertion-direction length B satisfies B<A; a plurality of through holes in which the plug shells are inserted respectively; and a guide hole that is positioned between the accommodation portion and the through holes and communicates the accommodation portion and the through holes to each other, and is formed in a manner to taper from the accommodation portion toward the through holes. The receptacle body is accommodated in each of the through holes. The receptacle contact is fixed to the receptacle body and is to be fitted to the plug contacts.

Effects of the Invention

The multiple coaxial connector according to the present invention is provided with a mechanism for correcting tilt and shaft misalignment in fitting between a plug and a receptacle and can accordingly prevent buckling of a contact and reduce an insertion force in the fitting.

DETAILED DESCRIPTION

Figure 1:
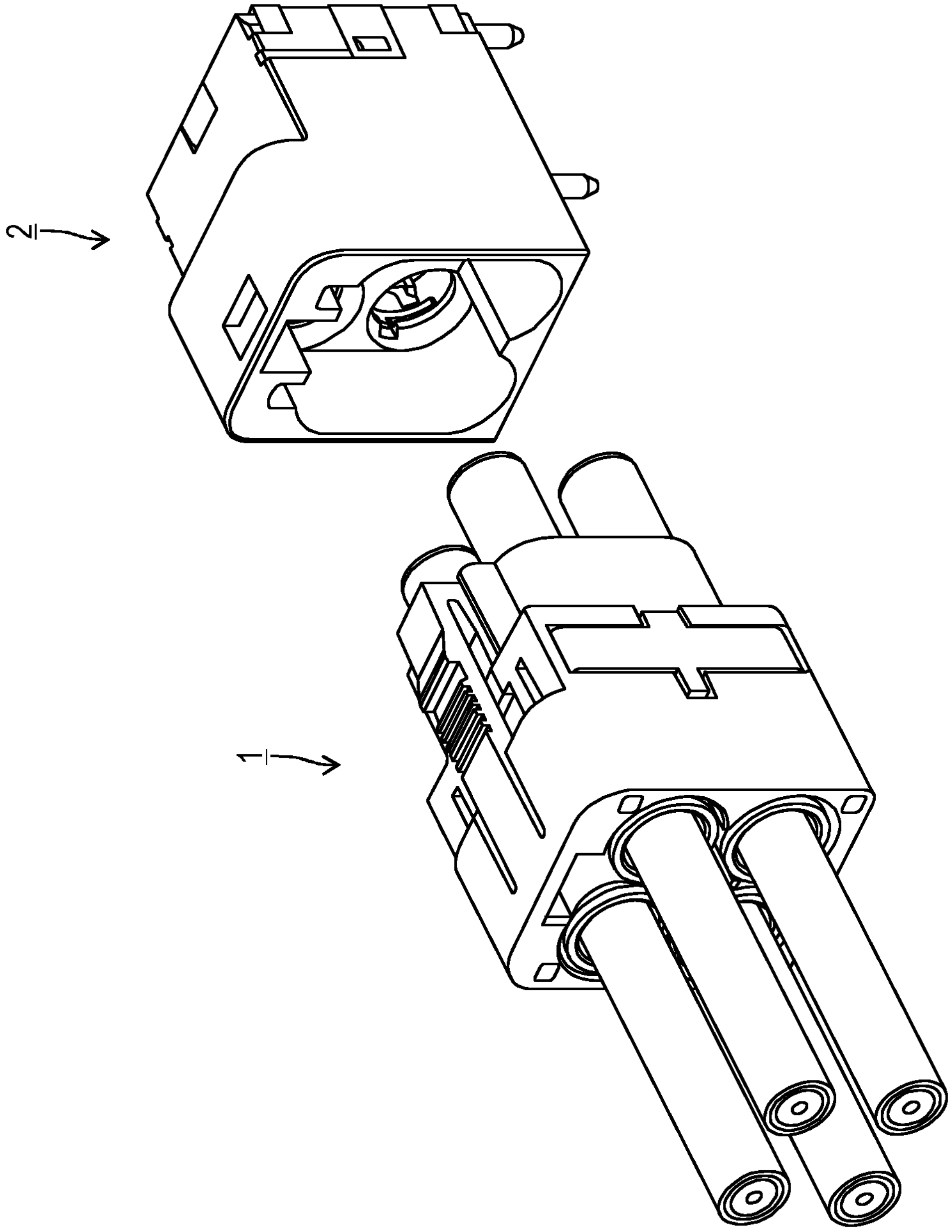
FIG. 1 is a perspective view illustrating a multiple coaxial connector according to a first embodiment.

An embodiment according to the present invention will be described in detail below. Components having the mutually-same functions will be provided with the same reference numerals and the duplicate description thereof will be omitted.

First Embodiment

A structure of a multiple coaxial connector according to a first embodiment will now be described with reference to FIGS. 1 and 2. As illustrated in FIG. 1, the multiple coaxial connector according to the present embodiment includes a plug 1 and a receptacle 2 that is connected with the plug 1.

Figure 2:
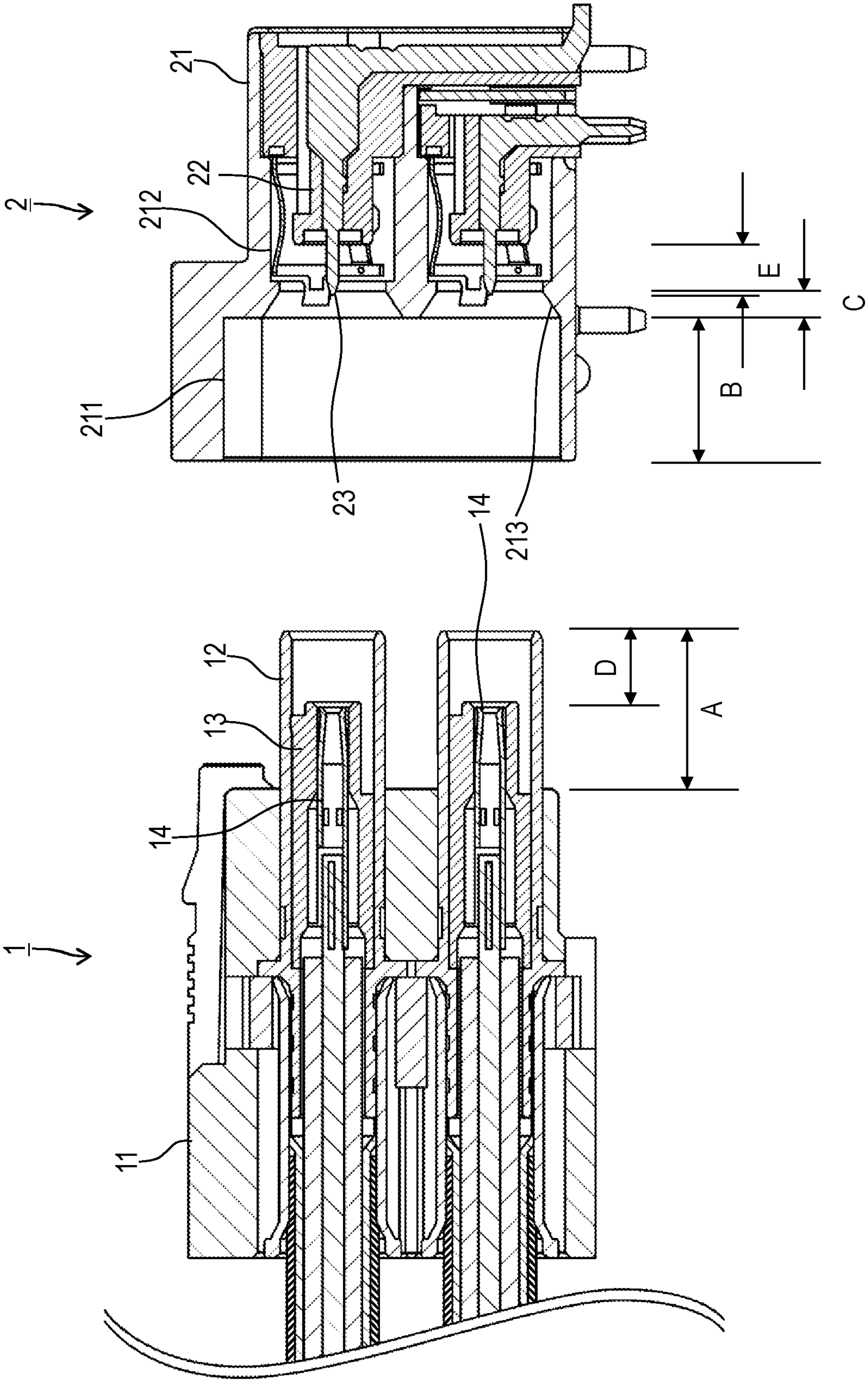
FIG. 2 is a first sectional view illustrating the multiple coaxial connector according to the first embodiment.

As illustrated in FIG. 2, the plug 1 includes a housing 11, a plurality of plug shells 12, a plurality of plug bodies 13, and a plurality of plug contacts 14. The plug shells 12 are accommodated in the housing 11 in a manner to protrude from the housing 11 by a predetermined length A. The plug bodies 13 are accommodated in respective plug shells 12. The plug contacts 14 are fixed to respective plug bodies 13. The housing 11 and the plug bodies 13 are made of an insulation material. The plug shells 12 and the plug contacts 14 are made of a conductor material.

The receptacle 2 includes a receptacle shell 21, a receptacle body 22, and a receptacle contact 23. The receptacle body 22 is made of an insulation material. The receptacle shell 21 and the receptacle contact 23 are made of a conductor material.

The receptacle shell 21 includes an accommodation portion 211, a plurality of through holes 212, and a plurality of guide holes 213. The accommodation portion 211 entirely accommodates ends of the plurality of plug shells 12 protruding from the housing 11 in connector insertion, and the insertion-direction length B of the accommodation portion 211 satisfies B<A (the reason will be described later). In connector fitting, the accommodation portion 211 accommodates part of the housing 11 without any gaps. The plug shells 12 are inserted into respective through holes 212. The guide hole 213 is positioned between the accommodation portion 211 and the through hole 212 and communicates the accommodation portion 211 and the through hole 212 to each other. The guide hole 213 is formed in a manner to taper from the accommodation portion 211 toward the through hole 212. The guide hole 213 is preferably formed in a cone trapezoidal shape.

The receptacle body 22 is accommodated in each through hole 212. The receptacle contact 23 is fixed to the receptacle body 22, and is fitted to the plug contacts 14 in connector fitting.

When C denotes an insertion-direction length of the guide hole 213 and T denotes a predetermined threshold value, it is preferable to form the receptacle shell 21 to satisfy IB+C-AI T (the reason will be described later).

Further, the end of the receptacle contact 23 is accommodated in the through holes 212 or the guide holes 213 as illustrated in FIG. 2. It is preferable to form the multiple coaxial connector so that a relation between an insertion-direction length D from the end of the plug contact 14 to the end of the plug shell 12 and an insertion-direction length E from the end of the receptacle contact 23 to the end of the receptacle body 22 satisfies D−E>0 (the reason will be described later).

[Description on Advantageous Effect in Setting B<A]

Figure 3:
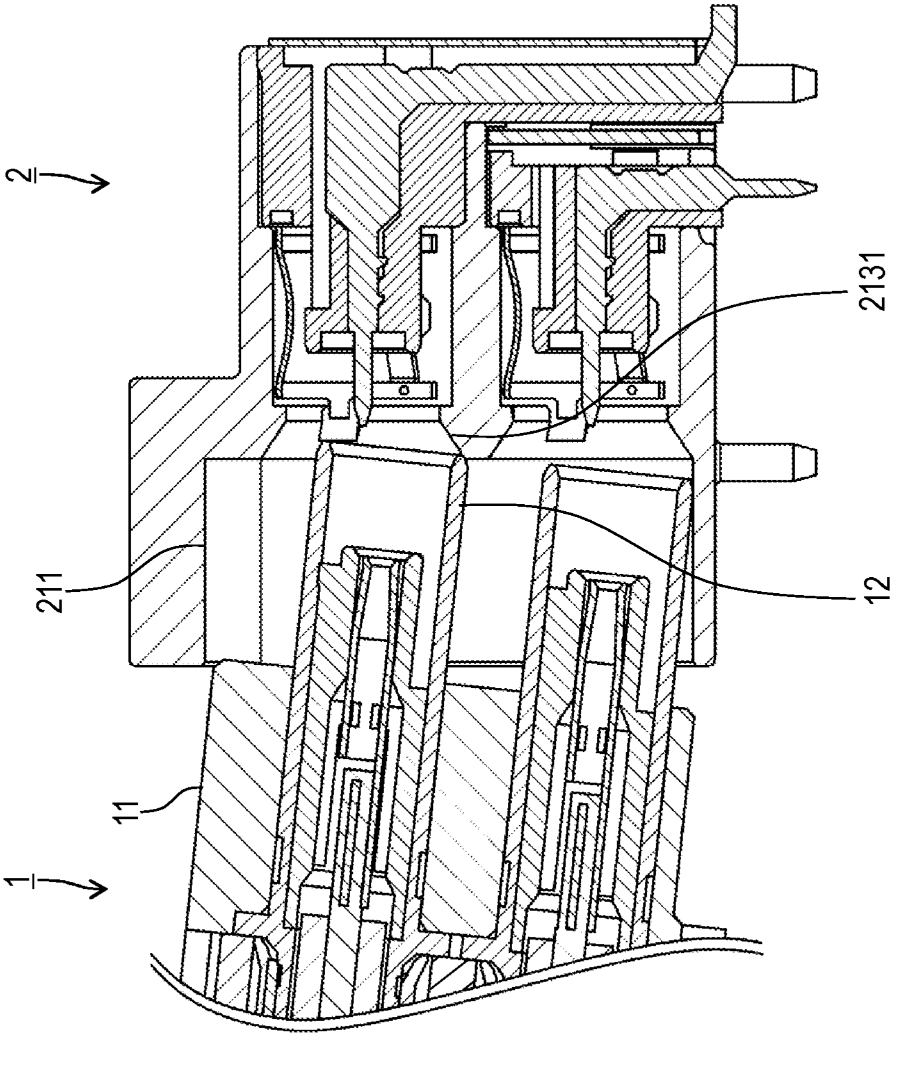
FIG. 3 is a second sectional view illustrating the multiple coaxial connector according to the first embodiment.

The multiple coaxial connector is formed to satisfy B<A. Accordingly, the end of the plug shell 12 reaches the innermost portion of the accommodation portion 211 and is guided by an inclined portion 2131 of the guide hole 213 before the housing 11 is fitted to the accommodation portion 211, as illustrated in FIG. 3. Other plug shells 12 are also guided in a similar manner by other inclined portions 2131 that are positioned to correspond to respective plug shells 12. Thus, fitting is easily performed even though the connector is a multiple coaxial type. Accordingly, tilt and shaft misalignment correction is performed by the inclined portions 2131 before the fitting between the housing 11 and the accommodation portion 211 starts, being able to prevent a large force from being applied to the housing 11 and the plug shells 12.

[Description on Advantageous Effect in Setting |B+C−A|≤T]

|B+C−A|, namely, an absolute value of a value, which is obtained by deducting the protruding length A of the plug shell 12 from the sum (B+C) of the insertion-direction length B of the accommodation portion 211 and the insertion-direction length C of the guide hole 213, is set to be equal to the predetermined threshold value T or to be smaller than T. Accordingly, the fitting between the housing 11 and the accommodation portion 211 starts at timing when the tilt and shaft misalignment correction by the inclined portions 2131 is almost finished (T>B+C−A>0), or timing when the correction is just finished (B+C−A=0), or timing shortly after the correction is finished (−T<B+C−A<0), being able to prevent a large force from being applied to the housing 11 and the plug shells 12 as described above.

[Advantageous Effect in Accommodating End of Receptacle Contact 23 in Through Hole 212 or Guide Hole 213 and Setting D−E>0]

The end of the receptacle contact 23 is accommodated in the through holes 212 or the guide holes 213 and D−E>0 (that is, D>E) is established. Accordingly, the fitting between the plug shells 12 and the receptacle body 22 starts before the fitting between the plug contacts 14 and the receptacle contact 23 starts. The fitting between the plug shells 12 and the receptacle body 22 corrects distortion caused by tilt and shaft misalignment and the contacts are mutually fitted after the correction, being able to prevent buckling of the contacts.

[Contact Position at Start of Fitting Between Housing 11 and Accommodation Portion 211]

Figure 4:
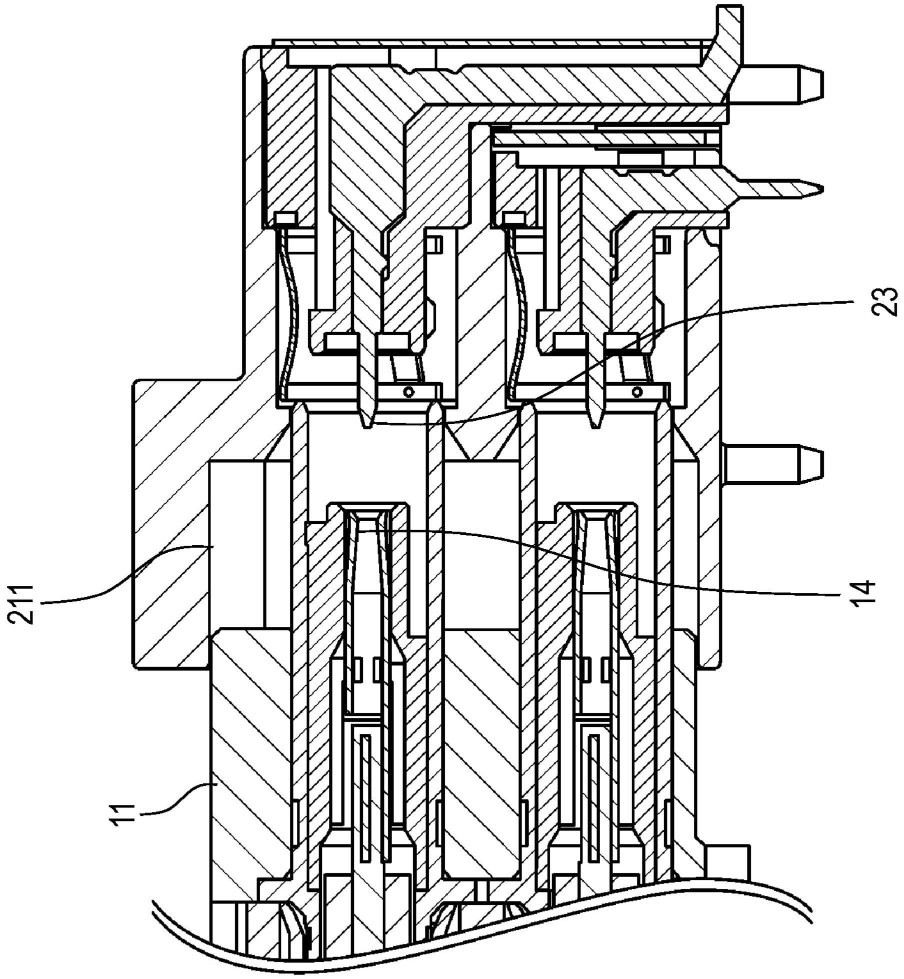
FIG. 4 is a third sectional view illustrating the multiple coaxial connector according to the first embodiment.
Figure 5:
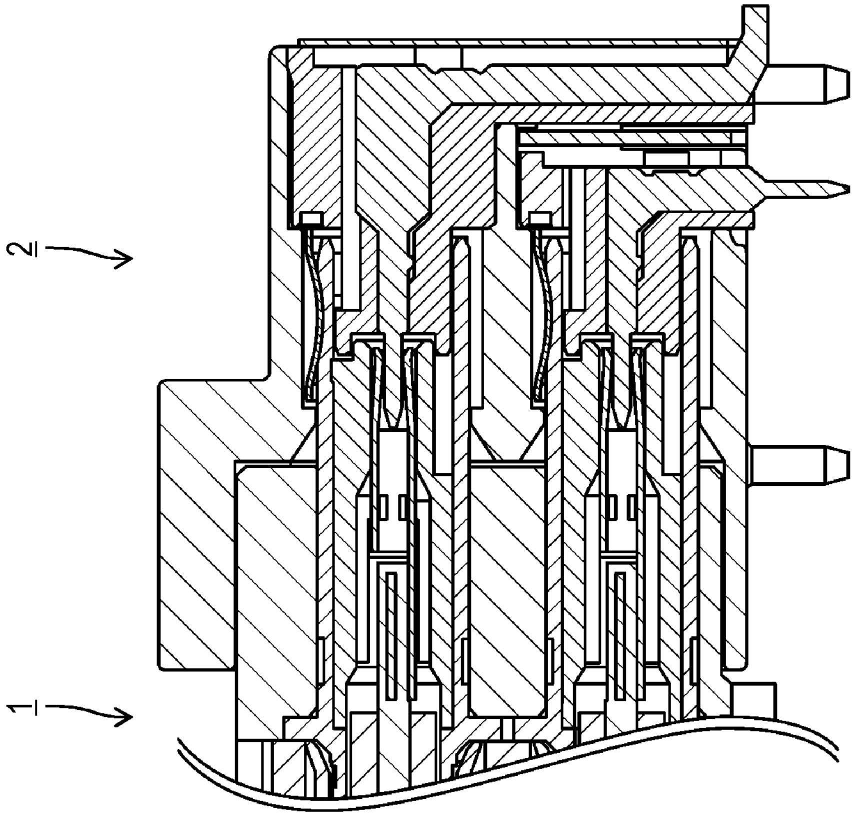
FIG. 5 is a fourth sectional view illustrating the multiple coaxial connector according to the first embodiment.

The plug contacts 14 and the receptacle contact 23 are arranged so that the fitting between the plug contacts 14 and the receptacle contact 23 does not start yet at the start of the fitting between the housing 11 and the accommodation portion 211, as illustrated in FIG. 4. Accordingly, after correction by the guide holes 213 is performed as a first stage and correction by the fitting between the housing 11 and the accommodation portion 211 is performed as a second stage, the fitting between the plug contacts 14 and the receptacle contact 23 starts. Thus, distortion caused by tilt and shaft misalignment is corrected and buckling of the contacts can be prevented. FIG. 5 is a sectional view illustrating a state in which the fitting between the plug contacts 14 and the receptacle contact 23 is finished.

The foregoing description of the embodiment of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A multiple coaxial connector comprising:
a plug; and
a receptacle that is connected with the plug, wherein
the plug includes
  a housing,
  a plurality of plug shells that are accommodated in the housing in a manner to protrude from the housing by a predetermined length A,
  a plurality of plug bodies that are accommodated in the plug shells respectively, and
  a plurality of plug contacts that are fixed to the plug bodies respectively, and
the receptacle includes
  a receptacle shell that includes
    an accommodation portion that entirely accommodates ends of the plurality of plug shells protruding from the housing in connector insertion, wherein an insertion-direction length B of the accommodation portion satisfies B<A,
    a plurality of through holes in which the plug shells are inserted respectively, and
    a guide hole that is positioned between the accommodation portion and the through holes and communicates the accommodation portion and the through holes to each other, and is formed in a manner to taper from the accommodation portion toward the through holes,
  a receptacle body that is accommodated in each of the through holes, and
  a receptacle contact that is fixed to the receptacle body and is to be fitted to the plug contacts.

2. The multiple coaxial connector according to claim 1, wherein an end of the receptacle contact is accommodated in the through holes or the guide hole, and a relation between an insertion-direction length D from ends of the plug contacts to the ends of the plug shells and an insertion-direction length E from the end of the receptacle contact to an end of the receptacle body satisfies D−E>0.

3. The multiple coaxial connector according to claim 1, wherein the guide hole has a cone trapezoidal shape.

4. The multiple coaxial connector according to claim 3, wherein an end of the receptacle contact is accommodated in the through holes or the guide hole, and a relation between an insertion-direction length D from ends of the plug contacts to the ends of the plug shells and an insertion-direction length E from the end of the receptacle contact to an end of the receptacle body satisfies D−E>0.

5. The multiple coaxial connector according to claim 1, wherein the receptacle shell is formed so as to satisfy $|B+C-A| \leq T$ when C denotes an insertion-direction length of the guide hole and T denotes a predetermined threshold value.

6. The multiple coaxial connector according to claim 5, wherein an end of the receptacle contact is accommodated in the through holes or the guide hole, and a relation between an insertion-direction length D from ends of the plug contacts to the ends of the plug shells and an insertion-direction length E from the end of the receptacle contact to an end of the receptacle body satisfies D−E>0.

7. The multiple coaxial connector according to claim 5, wherein the guide hole has a cone trapezoidal shape.

8. The multiple coaxial connector according to claim 7, wherein an end of the receptacle contact is accommodated in the through holes or the guide hole, and a relation between an insertion-direction length D from ends of the plug contacts to the ends of the plug shells and an insertion-direction length E from the end of the receptacle contact to an end of the receptacle body satisfies D−E>0.

* * * * *